INVENTORS
Erhardt Baer
Kurt Xylander

United States Patent Office 3,510,001
Patented May 5, 1970

3,510,001
FLOTATION CHAMBER FOR CLEANING SEWAGE AND THE LIKE
Erhardt Baer, 52 Sophienstr., and Kurt Xylander, 56 Libellenweg, both of Frankfurt am Main, Germany
Filed June 25, 1965, Ser. No. 510,994
Int. Cl. B01d 21/00; B03d 1/00
U.S. Cl. 210—192                                  1 Claim

ABSTRACT OF THE DISCLOSURE

An apparatus for purifying liquid by causing flotation of impurity particles present in the liquid. The generation of the gas bubbles to cause the flotation is produced electrolytically by means of electrodes located at the bottom of the flotation chamber.

---

The present invention concerns a process and an apparatus for the flotation of solids and/or slime particles, which occur colloidally or as a dispersion in an impure water, for the purpose of purifying the impure water.

The flotation technique has found acceptance in many fields of processing technology as a method for the separation of solids and liquids. The flotation effect is based, of course, on an adhesion between gas bubbles and the solid and/or slime particles to be floated, which are moved upward by the increase in buoyancy occurring in this manner and can be skimmed from the surface of the liquid.

The effectiveness of flotation depends on the fineness of the gas bubbles produced, especially in the flotation of suspended substances and hard-to-settle components. The greater the wettability of the surface of the solid and slime particles, the smaller the necessary size of the bubbles, if the necessary adhesion is to be given for the floating of the particle. Since, in the known flotation methods, the gas bubbles cannot be produced as small as may be desired, in many cases it is impossible in waste water purification to effect a phase separation by flotation, especially since, by the swelling to large gas bubbles, the very opposite of the desired phase separation is often reached, namely, an intensive mixing of the turbidity. For these reasons, attempts up to the present to purify waste waters by separation of the particles which are suspended or in colloidal form are mainly to be regarded as unsuccessful, since a flotation is successful there only in rare and especially favorable cases.

With the present invention, a method is made available by which extremely small gas bubbles can be produced, which makes possible a successful phase separation even in the case of waste water turbidity considered, up to now, impossible to float. The invention is distinguished by the fact that the gas bubbles are produced in the waste water turbidity by electrolysis. The oxygen and hydrogen bubbles, economically set free here in large amounts, which are formed from the water of the turbidity itself, are extraordinarily fine and induce even the finest suspended substances to a quick floating, by which the turbidity is rapidly impoverished in solids and/or slime particles.

Figure 1:
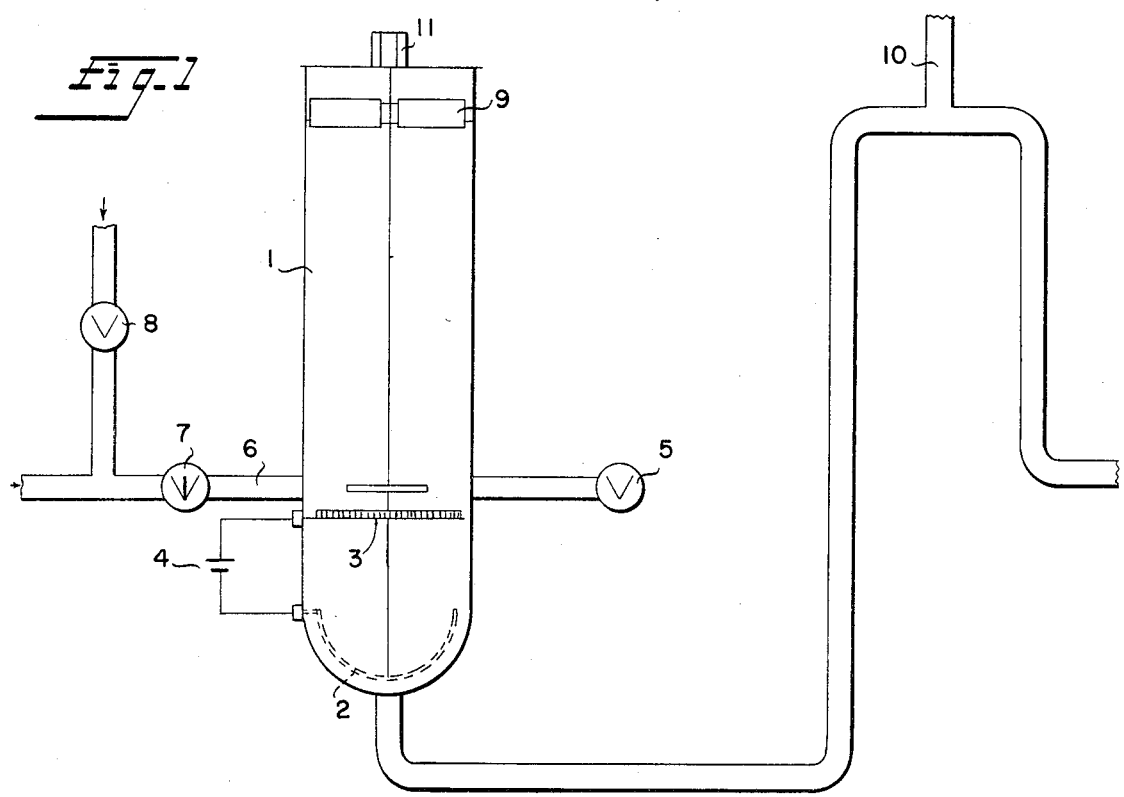
Figure 2:
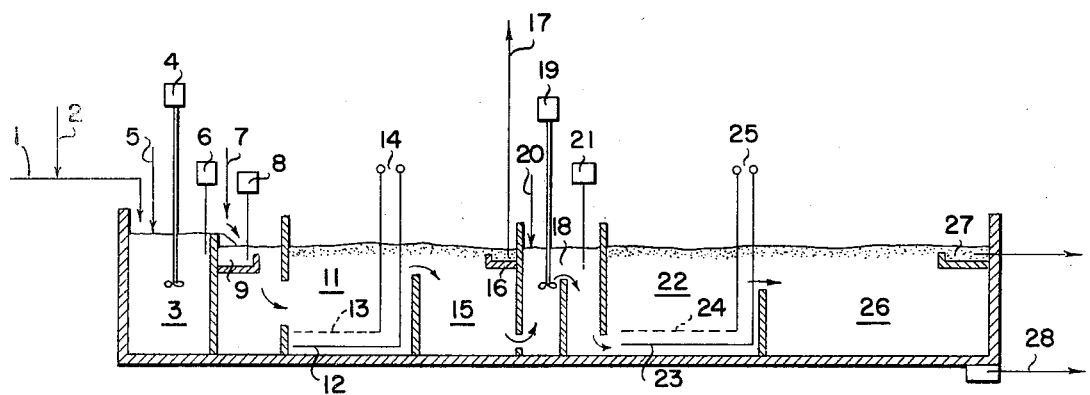

Referring now to the drawings, FIG. 1 is a schematic representation of a flotation process according to the invention and FIG. 2 is the same but for a multi-step process.

The flotation cell for carrying out the process according to this invention consists, to advantage, of a tank with electrodes arranged therein, one above the other while, above the upper electrode, perforated in a manner known per se, the feed line for reagents and turbidity is provided, and in the lowest part of the tank, below the lower electrode, an outlet pipe for the floated turbidity. The upper electrode may consist of a plate with holes in it, but it may also consist of sieve or screen-formed material. The openings in this upper electrode permit passage of the gas bubbles set free from the lower electrode, the particles floated by these and the turbidity.

Various substances already known for flotation may be used as flotation or precipitation reagents. For example, the addition of surface-active substances (foamers) to attain a stable foam may be practiced in carrying out the process of the invention. According to the kind of turbidity to be treated, there may also be an addition of reagents for the control of the hydrogen ion concentration, to attain better flotation conditions. Accumulators (agglomerators) may also be added to the turbidity which serve to reduce the wettability of the particles. In the treatment of certain waste water turbidities, the addition of flocculation agents is advantageous.

The upper and/or the lower electrode are suitably placed and preferably adjustable in height, by which the electric field between the electrodes can be influenced for the control of the flotation intensity. A similar effect can also be attained by varying the voltage laid on the electrodes.

For a rapid and even distribution of reagents in the waste water turbidity, it is advantageous to have an agitator arranged in the tank above the electrodes.

The process according to the present invention may be carried out either continuously or intermittently. In many cases, a single flotation of the turbidity is sufficient. However, it is also possible to float off the turbidity several times, in steps, according to the proposed process.

Other details of the invention will be explained below with reference to processing examples and flow diagrams. Example 1 is for purposes of comparison and concerns the flotation of a waste water turbidity by air bubbles produced in the known way.

EXAMPLE 1

One liter of waste water from the metal-processing industry, which consisted of about equal parts each of very dirty wash water, containing detergent, and used bore oil emulsion, with a pH value of 8.5, was treated with 5 milligrams aluminum sulfate. In this way, a pH value of 4.5 was set. After neutralizing with caustic soda solution to a pH value of 6.5, air was blown through a porous plate placed on the bottom of the tank, so that fine air bubbles rose in the fluid. The flakes resulting from precipitation were whirled about by the air bubbles, it is true, but a clear direction of movement to the fluid surface was not established. After 30 minutes blowing time, the test was broken off, since no phase separation began. Only after a settling time of 24 hours was there a separation of the waste water into about 60% by volume flocculated slime and about 40% clear water.

EXAMPLE 2

One liter of industrial waste water, of the exact composition according to Example 1, was poured into a vessel, in the bottom of which was placed a plate electrode and about in the middle a sieve-like plate electrode. After applying a direct voltage of 15 volts, the electrodes began to emit gas intensively over their whole surfaces. After adding 5 milligrams of aluminum sulfate and then neutralizing with caustic soda solution according to Example 1, a rapid clarification of the waste water began from below. After about 15 minutes the contents of the vessel were separated into a clear purified phase and an upper phase consisting of flocculated slime. The volume of slime was only about 8%.

The same results were attained by the use of 5 milligrams of iron sulfate instead of aluminum sulfate. For the purification of 1 liter of waste water in the manner described, only about 0.002 kilowatt hour was needed.

EXAMPLE 3

To one liter of river water with a pH value of 6.8 was added about 0.5 mg. aluminum sulfate and the pH value was set at 6.5 by adding caustic soda solution. Aluminum hydroxide flakes were formed, which settled very slowly. After about one hour the slime part was still about 10%. The water which stood above it was clear, but many floating flakes, and thus dirt particles, could be clearly seen in it.

Then one liter of the same river water was poured into another vessel which was provided, however, with two electrodes, one above the other, of which the upper electrode was perforated, and was likewise precipitated by adding 0.5 mg. aluminum sulfate and then neutralizing with an alkali solution. After applying a direct voltage of 15 volts to the two electrodes for a period of five minutes and then letting stand for about 5 minutes, all the flakes were floated to the top. The slime portion was only about 1%. The water below it was completely clear.

EXAMPLE 4

To a liter of waste water from a paper factory was added about 0.8 mg. of aluminum sulfate and the pH value was set at about 6.5 by adding caustic soda solution. The emulsion or dispersion was broken in this way, but the hydroxide flakes formed remained suspended and the water was still milky turbid from its content in paper fiber substances, kaolin and $TiO_2$.

Even after placing a frit in the vessel containing the waste water and blowing in finely divided air, there was no flotation effect produced. There was no separation into clear water and dirt particles.

Then, in another vessel, which was provided, however, with two electrodes one above the other, of which the upper electrode was perforated, there was poured one liter of the same waste water from the paper factory, and this also was flocculated by the addition of 0.8 mg. aluminum sulfate and then neutralizing with caustic soda solution. After applying a direct voltage of 15 volts to the two electrodes for a time of 5 minutes and then allowing to stand for about 5 minutes, all the turbidity substances were floated up and the water below was completely clarified.

A flotation chamber for carrying out the process according to the invention may have, for example, the structure to be seen from FIG. 1. Here, in a cylindrical tank 1 are arranged electrodes 2 and 3, which are suitably placed and height-adjustable on the wall of the tank. The feeding of current from the voltage source 4 may take place through the wall of the tank, but it may also take place from above or through the bottom.

Above the electrode 3 the feed line 6 opens into the tank 1 for the turbid fluid 1 to be treated, which is fed through a pump 7. The lines 5 and 8 serve for the feeding of flotation or precipitation chemicals. In the purification of waste water, a metal salt solution, for example, is metered through line 8 and through line 5 an alkali solution. In the treating of waste waters of high alkalinity, it has also proved advantageous to set the pH value below 4.5 by the addition of an acid, for example, sulfuric acid, so that the flocculation agent added is dissolved at once.

Instead of the feed openings shown for the turbid liquid and additives, turbid liquid and additives may also be fed at a tangent or in several places through a ring line of the tank 1, so that rapid mixing occurs. However, it is also possible to use an agitator 11 for this purpose, designed, for example, as a blade agitator.

The floated slime and/or solid particles are removed at the fluid surface by slime removers 9, known per se. The impoverished turbid liquid or the clear water, as the case may be, is drawn off at the bottom of the chamber through a siphon 10 and if necessary conducted to other flotation chambers of the described design.

The structure of the water purification plant is similar, when instead of circular tanks, square tanks are used. For example, a plural-step water purification plant might consist of several connected rectangular tanks with the corresponding built-in apparatus. (See FIG. 2.) (The numbering in FIG. 2 is independent of the numbering used in FIG. 1.)

Referring to FIG. 2, the incoming waste water (line 1) is treated with metal salt through a dosing line 2 and mixed in chamber 3. The pH value necessary for the precipitation of the particular metal salt is adjusted through feed 5, according to the pH measurement 6 by means of a regulating device.

The flocculated waste water arrives through an overflow dam into channel 9 where, by means of dosing device 7, controlled by the pH measuring or regulating device 8, an acid or an alkali is fed, to dissolve the hydroxide (flocculated in chamber 3) again. In the chamber 11 are two plate electrodes 12 and 13, lying one above the other, of which the upper is perforated. Through the flotation effect of the gas bubbles resulting from applying a voltage (connection 14), the demulsified dirt particles are floated up and accumulate at the surface of the tank 11 and the connected settling tank 15, from which they can be drawn off through channel 16 and through line 17. From the tank 15, the pre-purified water arrives in the mixing tank 18 with mixer 19, where if desired another metal salt may be added or where, by the addition of an acid or alkali through dosing line 20 and pH regulation 21, the metal salt already dissolved in the water is flocculated out again as hydroxide. From the mixing tank 18 the water is conducted into tank 22, where the metal hydroxide is floated up by the very fine gas bubbles resulting in the electrolysis. The feeding of the electric current takes place through connection 25. The electrode 24 lying above the electrode 23 is likewise perforated, so that the gas bubbles leaving the electrode 23 can pass through the electrode 24. The waste water finally arrives in a settling chamber 26. The slime floated up in the electrolysis is drawn off through the channel 27, while the clarified waste water is taken from line 28 and conducted into the drainage. The slime from channel 27 can then be further concentrated or the metal hydroxide may be dissolved by means of an acid or alkali and conducted back for the separation of the separated impurities at the corresponding places in the waste water purification plant.

It is to be understood that the invention is not to be limited to the exact procedure, details of operation or exact compounds, compositions, or materials shown and described, as obvious modifications and equivalents will be apparent to one skilled in the art, and the invention is therefore to be limited only by the scope of the appended claim.

We claim:
1. An apparatus for purifying a liquid by causing flotation of impurity particles present in said liquid, comprising a tank, an overflow dam positioned within said tank and dividing said tank into two adjacent flotation chambers adapted to contain said liquid comprising an influent chamber and an effluent chamber, the upper edge of said overflow dam being lower than the upper edges of the walls of said tank and being adapted to raise said liquid as it passes from the influent to the effluent chamber and to permit liquid to flow over the upper edge of said dam, said influent chamber having an influent port and containing a pair of sheet-form electrodes horizontally mounted near the bottom in vertically spaced-apart relationship with respect to each other, at least the upper one of said electrodes being perforated, means associated with and adapted to apply an electrical current to said electrodes for electrifying said liquid to generate gas bubbles in an amount sufficient to cause flotation of said impurity particles, and means for removing flotated slime from the surface of said liquid, said effluent chamber having an outlet positioned substantially below the upper edge of said dam thereby enabling purified liquid to be removed from said chamber.

References Cited

UNITED STATES PATENTS 1,746,964   2/1930   Polatsik _____ 204—186

FOREIGN PATENTS

| 478,764 | 1/1938 | Great Britain. |
| 676,854 | 8/1952 | Great Britain. |
| 859,417 | 1/1961 | Great Britain. |
| 347,240 | 1/1922 | Germany. |

JOHN H. MACK, Primary Examiner

T. TUFARIELLO, Assistant Examiner

U.S. Cl. X.R.

210—44, 252, 538